July 15, 1930.  R. D. LANE  1,770,790
SEAL FOR FREIGHT CARS AND THE LIKE
Filed Dec. 8, 1926

Inventor
RICHARD D. LANE
By Murray & Gugelter
Attorneys

Patented July 15, 1930

1,770,790

UNITED STATES PATENT OFFICE

RICHARD D. LANE, OF AUGUSTA, KENTUCKY, ASSIGNOR TO THE F. A. NEIDER COMPANY, OF AUGUSTA, KENTUCKY, A CORPORATION OF KENTUCKY

SEAL FOR FREIGHT CARS AND THE LIKE

Application filed December 8, 1926. Serial No. 153,368.

This invention relates to improvements in seals for freight cars and the like.

An object of this invention is to provide a seal which requires a minimum of parts and which is inexpensive to manufacture.

Another object of this invention is to provide a housing member for seals the component parts of which may be stamped from a sheet of metal.

Another object of this invention is to provide a seal that if once used to secure a compartment the compartment cannot be entered unless the seal is destroyed.

Another object of this invention is to provide a seal comprising a housing member and a frangible strip of material, having certain identification marks on each, the housing member and the frangible strip.

These and other objects are attained by the means described herein and disclosed in the accompanying drawings, in which.

Figure 3:
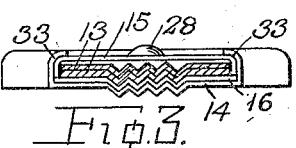
Fig. 3 is a sectional view taken on line 3—3 of Fig. 2.
Figure 6:
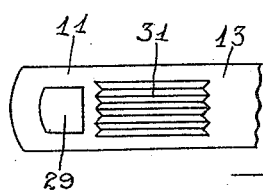
Fig. 6 is a fragmental plan view of a frangible strip forming a part of this invention.
Figure 6:
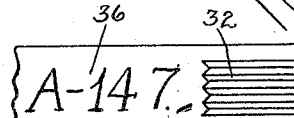

The improved seal comprises a housing member 10 in which the opposite ends 11 and 12 of a frangible strip 13 are secured. The housing member 10 comprises an outer housing 14 and an inner housing 15 interiorly of which is secured a plate 16. The housings 14 and 15 have substantially circular body portions 17 from which tongues 18 extend. The peripheries of the body portions 17 and the longitudinal edges of the tongues 18 are bent at an angle to the said body portions and tongues to provide peripheral flanges 20 and 21 on the housings 14 and 15 respectively. The outside dimensions of the inner housing 15 is slightly smaller than the inside dimensions of the outer housing 14 so that the inner housing 15 may be received within the outer housing 14, see Fig. 3. The tongue 18 of the outer housing 14 is provided with flutes 22, the purpose of which flutes will be explained later.

The plate 16 conforms to the inside dimensions of the outer housing 14 and comprises a body portion 23 and a tongue 24. The tongue 24 is provided with flutes 25 similar to the flutes 22 formed in the housing 14. The flutes 22 and 25 extend in a common direction and are adapted to be nested within one another. A spring lug 26 is struck from the body portion 23 and extends in the opposite direction from the tongue 16. The point or outer end 27 of the lug 26 is adapted to enter a pocket 28 formed in the body portion 17 of the inner housing 15.

The spring lug 26 is adapted to be received within perforations 29 and 30 formed adjacent the opposite ends 11 and 12 of the frangible strip. Adjacent to the perforations 29 and 30 flutes 31 and 32 are formed. The flutes 31 and 32 are stamped from the opposite sides so that when the strip 13 is bent upon itself the flutes 31 and 32 may be nested. It should be noted that flutes 22, 25, 31 and 32 are all the same and are adapted to be nested one within another as clearly shown in Fig. 3.

Figure 1:
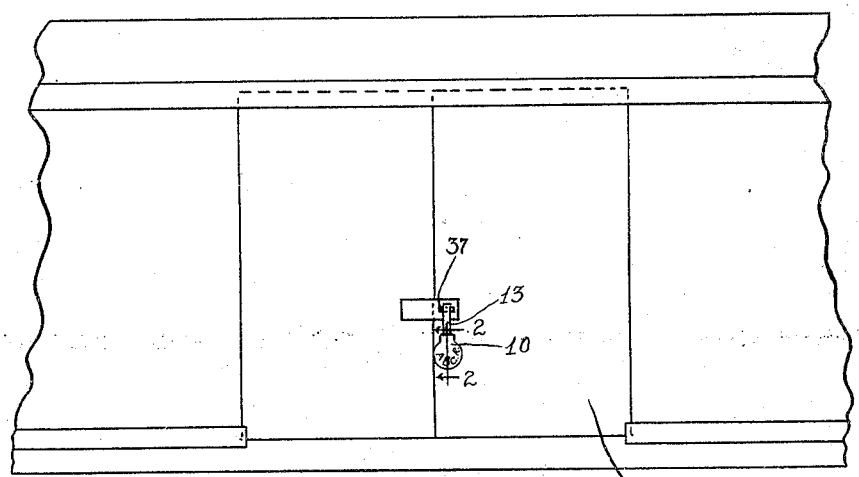
Fig. 1 is a fragmental view of a box car showing a seal of this invention mounted thereon.
Figure 2:
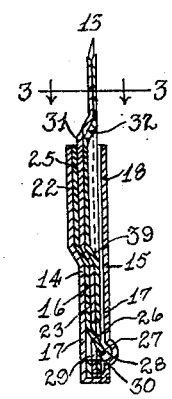
Fig. 2 is an enlarged fragmental sectional view of the seal of this invention taken on line 2—2 of Fig. 1.
Figure 4:
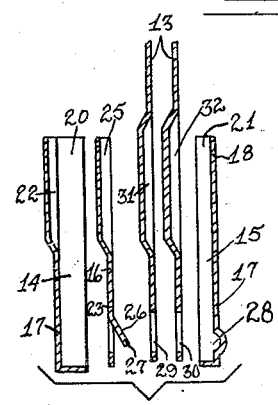
Fig. 4 is a sectional view, similar to the sectional view in Fig. 2, showing the individual parts of the seal separated from one another.
Figure 5:
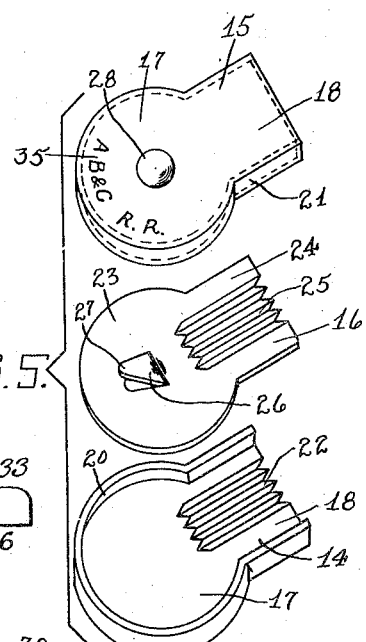
Fig. 5 is a perspective view of the individual parts of the housing member forming a detail of this invention.

The operation of the device is as follows. The inner and outer housings and the plate are first formed as shown in Fig. 5. The plate is then placed within the peripheral flange of the outer housing and the inner housing is then placed upon the plate 16 so that the free edge of its peripheral flange contacts the plate. The free edge 33, see Fig. 3, of the outer housing is then crimped over the inner housing member so that the three parts of the member are secured upon one another. It should be noted that the inner housing 15 may be provided with suitable indicia 35 to indicate or designate the owner of the seal. The frangible strip 13 is also provided with identifying marks 36. One end 11 of the frangible strip 13 is now inserted between the plate 16 and the inner housing 15 until the spring lug 26 is within the perforation 29 and the flutes 31 are nested in the flutes 25. The other end 12 of the strip 13 is now inserted through the staple 37 carried by the freight car door 38 and bent upon itself preparatory to being inserted within the housing member between the inner housing 15 and the end 11 of the strip. This end 12 is now inserted within the housing member until the spring lug 26 is received within its perforation 30.

It should be noted that the flutes 32 do not extend to the extreme end edge of the frangible strip 13 but stop short of the perforation 30 whereby a shoulder 39 is provided. The shoulder 39 prevents the insertion of a foreign object into the housing to depress the lug 26 to unlawfully open the seal. It should also be noted that each of the component parts of the housing member may be stamped from a strip of material whereby an inexpensive member may be manufactured. Further, with this device some of the identifying indicia, usually carried by the frangible strip, may be placed upon the housing member. For example, the name of the railroad over whose lines the freight car is being transported may be stamped on the housing member and the number of the seal may be impressed in the frangible strip. It is evident that considerable time and annoyance are saved the user of this seal by having the railroad company's name placed on the member when the seal is manufactured instead of placing it in the seal strip at the time that the number is being placed on the frangible strip.

What is claimed is—

1. In a seal for freight cars the combination of a housing member comprising an inner and an outer housing secured upon one another, each of the housings have a cylindrical body portion and a tongue extending therefrom, the tongue of the outer housing having flutes formed therein and the body portion of the inner housing having a pocket formed therein, a plate secured between the housings comprising a body portion and a tongue extending from the body portion, flutes formed in the tongue of the plate, a spring lug struck from the body portion of the plate, the flutes of the plate nesting with the flutes in the outer housing and the free end of the spring lug being received in the pocket, and a frangible seal strip having a perforation formed in each of its ends and flutes formed in the strip adjacent the perforations, the perforations in the frangible strip receiving the spring lug and the flutes in the frangible strip nesting with the flutes in the plate.

2. A seal for freight cars comprising a pair of housings secured upon one another, each housing comprising a body portion and a tongue extending from the body portion, flutes formed in the tongue of one of the housings, a spring lug within the housings having the free end of the lug adjacent one of the housings, and a frangible seal strip having a perforation formed in each of its ends and flutes formed in the frangible strip adjacent the perforations, the perforations in the frangible strip receiving the spring lug and the flutes in the frangible strip nesting with the flutes in the housing.

3. A housing member for seals comprising a pair of housings secured upon one another, each of the housings comprising a body portion and a tongue extending from the body portion, a plate secured between the housings, a depressible lug extending from the plate, and flutes formed in the plate and one of the housings adapted to be nested.

4. In a strap seal construction the combination of a pair of relatively flat flanged housing members secured together, one of which fits within the other, said other housing member having longitudinal corrugations therein, a plate superposed within the closure formed by said housing members and having a spring lug struck outwardly therefrom, said plate having corrugations complementary to those in said housing, the first mentioned housing member having a restricted pocket into which the spring lug projects, and a frangible strap having its opposite ends brought together and perforated coincidentally, said strap having corrugations adjacent each of its ends complementary to the corrugations on the housing and plate, the ends of the strap being insertible in the housing and serving to momentarily remove the lug on the plate from the pocket and to subsequently permit the lug to return through the perforations in the strap into the pocket to preclude removal of the strap from the housing.

In testimony whereof, I have hereunto subscribed my name this 4th day of December, 1926.

RICHARD D. LANE.